(12) United States Patent
Hon et al.

(10) Patent No.: US 8,590,418 B2
(45) Date of Patent: Nov. 26, 2013

(54) ADJUSTING MECHANISM FOR HANDLE POSITION OF BICYCLE

(75) Inventors: David Tak-Wei Hon, Shenzhen (CN); Jianhua Wu, Shenzhen (CN); Hanxin Zheng, Shenzhen (CN); Yiping Mo, Shenzhen (CN)

(73) Assignee: Dahon Technologies, Ltd., Shajing Town, Bao An District, Shenzhen, Guangdong (CN)

( * ) Notice: Subject to any disclaimer, the term of this patent is extended or adjusted under 35 U.S.C. 154(b) by 0 days.

(21) Appl. No.: 13/138,946

(22) PCT Filed: Apr. 15, 2010

(86) PCT No.: PCT/CN2010/000498
§ 371 (c)(1),
(2), (4) Date: Dec. 5, 2011

(87) PCT Pub. No.: WO2010/127549
PCT Pub. Date: Nov. 11, 2010

(65) Prior Publication Data
US 2012/0079911 A1 Apr. 5, 2012

(30) Foreign Application Priority Data
May 4, 2009 (CN) .......................... 2009 1 0039137

(51) Int. Cl.
*B62K 21/16* (2006.01)
(52) U.S. Cl.
USPC ...................................................... 74/551.3
(58) Field of Classification Search
USPC .................. 74/551.1, 551.3, 551.4; 180/222; 280/276; 403/52, 83; 16/421
See application file for complete search history.

(56) References Cited

U.S. PATENT DOCUMENTS

| | | | | | |
|---|---|---|---|---|---|
| 620,242 | A | * | 2/1899 | Lusebrink | 74/551.4 |
| 657,290 | A | * | 9/1900 | Landis | 74/551.5 |
| 4,783,187 | A | * | 11/1988 | McMurtrey | 403/24 |
| 5,509,328 | A | * | 4/1996 | Lai | 74/551.3 |
| 5,755,141 | A | * | 5/1998 | Chen | 74/551.3 |

* cited by examiner

*Primary Examiner* — Vicky Johnson
(74) *Attorney, Agent, or Firm* — Charles E. Baxley

(57) ABSTRACT

An adjusting mechanism for the handle position of a bicycle includes an upper cover (2) and a lower cover (3), which clamp the handle, and a handle vertical pipe (5) fastened on the front fork by a retaining mechanism. One side of the upper cover and one side of the lower cover for clamping the handle are connected with each other, and the other sides can be interlocked by an independent retaining mechanism. The top of the handle vertical pipe is provided with steps (6), and the lower cover is sleeved outside the handle vertical pipe and arranged below the steps at the top of the handle vertical pipe. As the lower cover is sleeved outside the handle vertical pipe and arranged below the steps at the top of the handle vertical pipe, the handle vertical pipe can be tightly fixed on the front fork by the retaining mechanism, furthermore, the handle position can be repeatedly adjusted without influencing rigidity between the front fork and the handle, thus the bicycle becomes more comfortable and has better safety performance. Meanwhile, by loosening the retaining mechanism, the whole handle system can rotate relative to the vertical pipe. When the bicycle is not in use, the handle can be rotated downward to the direction parallel to the body of the bicycle, thereby reducing space occupied by the bicycle.

10 Claims, 4 Drawing Sheets

ADJUSTING MECHANISM FOR HANDLE POSITION OF BICYCLE

TECHNICAL FIELD

The present invention relates to an adjusting mechanism for handle position of bicycle.

BACKGROUND OF THE INVENTION

The distance between the handle and the paddle of the bicycle makes a great difference to the riders' comfort. Different riders require different distances between the handle and the paddle. In order that the same bicycle can meet the comfort requirements of different riders, the handle of the bicycle is configured to be adjustable in front and back directions, so that, the distance between the handle and the paddle can be changed by adjusting the angle of the handle so as to meet the requirements of different riders. Folding bicycles have become very popular in the last twenty years, and it has become a very important requirement that the handle can be folded to minimize the bicycle.

FIG. 1 is a schematic view illustrating an adjusting mechanism for handle position of bicycle in the prior art. Middle part of the handle 1a is clamped tightly by the upper cover 2a and the lower cover 3a. The upper cover and the lower cover are hinged on one side with a hinge axle 4a. The lower cover and the handle vertical pipe 5a of the bicycle are fixed together. The draw-in bolt 8a goes through the upper cover, the lower cover and the handle vertical pipe, and is screwed into the inclined nut 9a at the bottom of the handle vertical pipe. By screwing the draw-in bolt, the handle vertical pipe and the inclined nut are tight-up and get stuck in the front fork vertical pipe, and the upper cover and the lower cover are made to clamp the handle tightly. When the draw-in bolt is released, the upper cover and the lower cover will release the handle. Now turn the handle and adjust its angle of inclination to meet the comfort requirements of bicycle riders. What's more, the handle can be rotated downwards for 180° and rotated leftwards and rightwards for 90°, so that the handle clings to the bicycle frame and the bicycle is partly folded. However, the folded handle has to be vertical to the front fork vertical pipe, which is by far unable to minimize the folded bicycle. Additionally, the locking of the upper cover and the lower cover and the locking of the handle vertical pipe and the inclined nut are realized by the same draw-in bolt, so when the draw-in bolt releases or locks the upper cover and the lower cover, the handle vertical pipe and the front fork vertical pipe will get released or locked accordingly. In order to ensure that the handle vertical pipe and the inclined nut are tight-up in the front fork vertical pipe reliably, the outer wall of the inclined nut is provided with vertical threads 15a which can increase the friction between the outer wall of the inclined nut and the inner wall of the front fork vertical pipe. The vertical threads will wear the inner wall of the front fork vertical pipe every time when the inclined nut is tight-up in the front fork vertical pipe. The inner wall of the front fork vertical pipe will be worn heavily after adjusting the angle of the handle for several times, which will affect the rigidity of the front fork vertical pipe, and thereby the safety performance of the bicycle. Additionally, since one bolt needs to release or lock two connections at one time, the bolt requires a long travel distance, which makes it impossible to replace the manual operation with common quick locking operation.

In recent twenty years, the vertical pipe joint of the handle of traditional folding bicycle is thus configured as shown in FIG. 7. The handle is provided with a vertical pipe extending downwards in the middle, and provided with a joint at the bottom. The joint is provided with an upper cover and a lower cover. The upper cover and the vertical pipe are closely linked together, and the lower cover and the front fork vertical pipe are closely linked together. The upper cover and the lower cover are hinged together on one side, and are provided with a cover locking mechanism on the opposite side, which can be operated easily without any tools. Thus the handle can be fixed for riding, also the handle can be released to fold the handle downwards for 180° so as to reduce the space occupied. This kind of folding method, which has been popular for about twenty-five years, is convenient, and the optimal position of the handle folded is chosen according to the angle of the hinge axle designed. However, this kind of bicycle has serious defects as follows: firstly, the front and back distance of the handle cannot be adjusted to meet the demands for riding; secondly, the machining accuracy required is too high, which causes unsatisfactory in the cost, the weight, the service life, and the safety. This method for folding the bicycle requires high intensity for the joint and high accuracy for the folding position, which makes the joint considerably heavy and the cost considerably high (30-50 RMB each). In order to minimize the space occupied by the bicycle folded, the angle of the brake handle of the bicycle is adjusted to around 0° (the angle to the horizontal plane), which doesn't meet the standard of the bicycle. And other mechanism must be added in order that the angle of the brake handle can be adjusted when folding the bicycle, which makes the operation inconvenient, the cost be increased by about 30 RMB and the weight increased by about 0.2 Kg.

SUMMARY OF THE INVENTION

The present invention is aimed at providing an adjusting mechanism for handle position of bicycle with low cost and long service life, strong rigidity and good safety performance, wherein the clamping of the handle is independent from the securing between the handle vertical pipe and the front fork. The handle can be turned conveniently around a horizontal axis and around a vertical axis.

The adjusting mechanism for handle position of bicycle of the present invention, comprises an upper cover and a lower cover for clamping the handle, and a handle vertical pipe. The handle vertical pipe can be fixed on the front fork vertical pipe with a pipe locking mechanism. The upper cover and the lower cover for clamping the handle are connected with each other on one side, and are locked together with a cover locking mechanism on another side. A top of the handle vertical pipe is provided with a step, and the lower cover is sleeved outside the handle vertical pipe and disposed below the step.

According to the adjusting and folding mechanism for handle position of bicycle of the present invention, the handle vertical pipe can be tightly fixed on the front fork vertical pipe with the pipe locking mechanism. The upper cover and the lower cover for clamping the handle are connected with each other on one side, and are locked together with the independent cover locking mechanism on another side. The clamping and releasing of the upper cover and the lower cover does not interfere with the securing between the handle vertical pipe and the front fork vertical pipe. During adjusting the distance between the handle and the saddle, it is not needed to tighten or loosen the connector between the handle vertical and the front fork vertical pipe, but simply to release the cover locking mechanism of the upper cover and the lower cover directly and turn the handle around the horizontal axis. The tightness of the handle vertical pipe and the front fork vertical pipe won't be affected in the whole process. It will not occur as in the current products that, due to multiple times of loosening and tightening, and due to friction from the inclined nut, the outer threads of the inclined nut scratch the inner wall of the front fork vertical pipe, leading to affect to the rigidity of the front fork vertical pipe. Adjusting the position of the handle repeatedly will no longer affect the rigidity of the front fork vertical pipe, and the safety performance of the bicycle is better. What's more, when the cover locking mechanism is released, the upper cover and the lower cover can be turned around the vertical axis, which can drive the handle to turn around the handle vertical pipe. When the bicycle is not in use, the handle can be turned to the direction parallel to the bicycle body so as to reduce the space occupied by the bicycle. The adjusting mechanism can be used on a folding bicycle, without using folding joints, the handle is folded and gathered to one side of the bicycle frame so as to reduce the space occupied by the bicycle. No folding joints are installed on the handle vertical pipe of the bicycle, which can enhance the rigidity and shock resistance of the bicycle.

Adjustable and folding handle has been one of the main research themes for inventors in this field for more than a hundred years. There are hundreds of patents now, but all have defects more or less. With this present invention, the cost is reduced to the lowest (15 RMB), the weight is very light (0.3 Kg), and a safe solution is achieved. Although the present invention is simple, it is an important development in 2-wheeled or 3-wheeled vehicles for transportation.

DETAILED DESCRIPTION OF THE PREFERRED EMBODIMENTS

Figure 1:
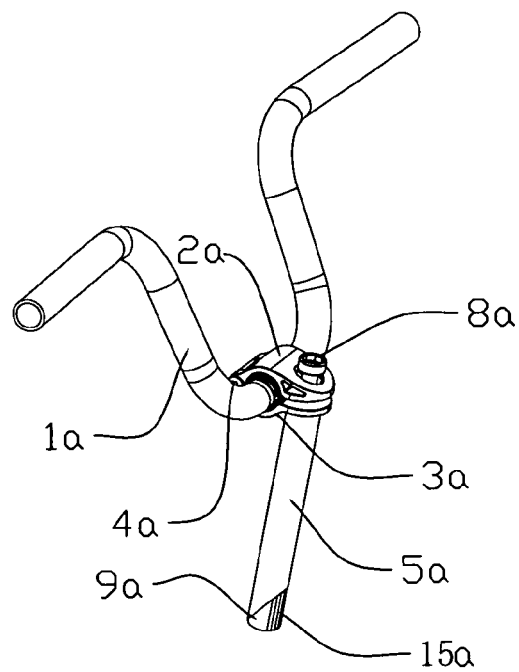
FIG. 1 is a schematic view illustrating an adjusting mechanism for handle position of bicycle in the prior art.
Figure 2:
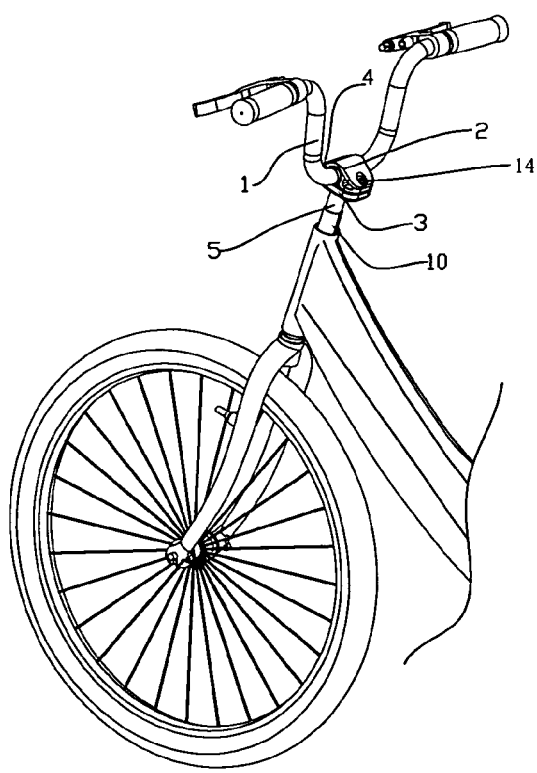
FIG. 2 is a schematic view illustrating the adjusting mechanism for handle position of bicycle of the present invention.
Figure 3:
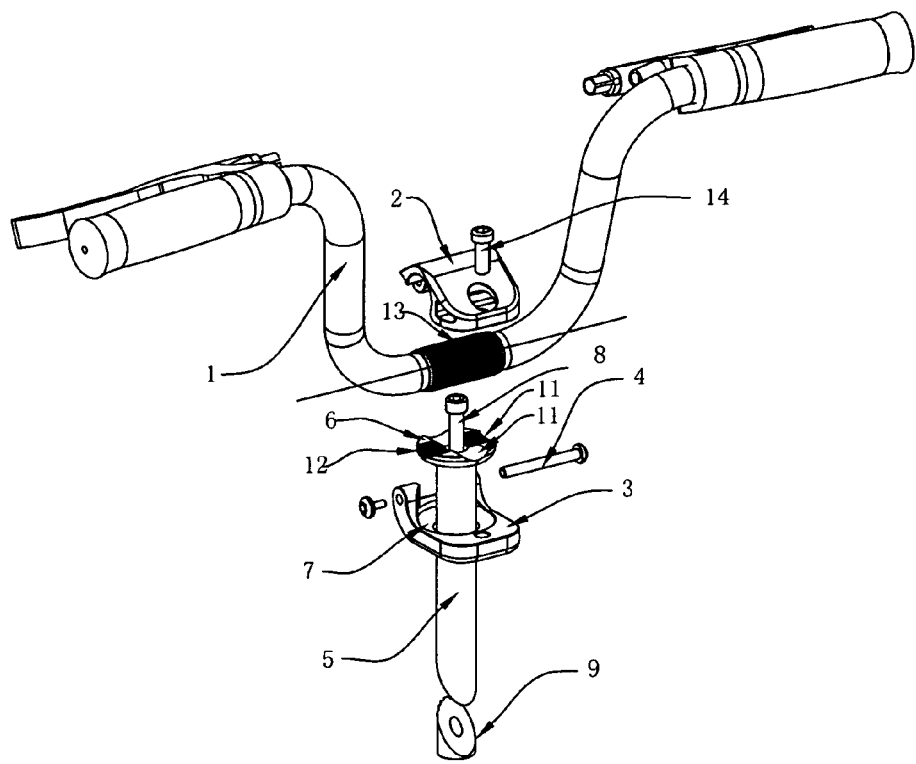
FIG. 3 is an exploded view illustrating the adjusting mechanism for handle position of bicycle of the present invention.

An adjusting mechanism for handle position of bicycle, as shown in FIGS. 2 and 3, comprises an upper cover 2 and a lower cover 3 for clamping the handle 1, which are hinged on one side with a rotation shaft 4, and are equipped with a cover locking mechanism on another side for locking the upper cover and the lower cover together. The cover locking mechanism for locking the upper cover and the lower cover may be an eccentric drag-link mechanism 14, which is commonly used in a folding bicycle and commonly known as a quick release. As shown in FIG. 2, the quick release can lock and release the upper cover and the lower cover quickly and conveniently. The cover locking mechanism may alternatively be a bolt which is not shown in figures. The upper surface of the lower cover 3 is provided with a concave 7, and a top of a handle vertical pipe 5 is provided with a step 6. The lower cover 3 is sleeved outside the handle vertical pipe 5 and disposed below the step. The concave of the lower cover matches with the step of the handle vertical pipe. The handle vertical pipe can be tightly fixed on a front fork vertical pipe 10 with a pipe locking mechanism. The pipe locking mechanism, as shown in FIG. 3, includes an inclined nut 9 disposed at a bottom of the handle vertical pipe and a first draw-in bolt 8 disposed inside the handle vertical pipe. The first draw-in bolt 8 goes through the handle vertical pipe and is screwed into the inclined nut 9 at the bottom of the handle vertical pipe. The inclined nut and the handle vertical pipe are tight-up in the front fork vertical pipe 10 by screwing the first draw-in bolt.

Figure 4:
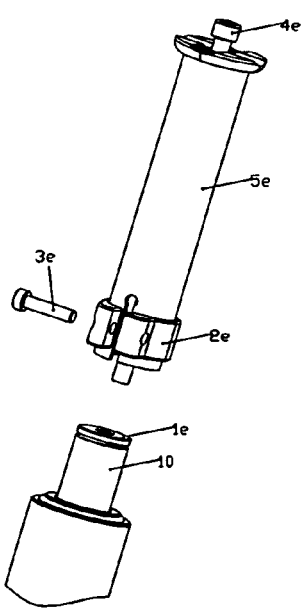
FIG. 4 is a schematic view illustrating installation of the handle vertical pipe with the front fork vertical pipe.

The handle vertical pipe is fixed tightly in the front fork vertical pipe 10 with the pipe locking mechanism. The pipe locking mechanism, which may, as shown in FIG. 4, include a pipe clamp 2e hooping the handle vertical pipe, a fastening bolt 3e for the pipe clamp, a second draw-in bolt 4e and a draw-in nut 1e. The bottom of the handle vertical pipe is provided with a rectangular notch. The second draw-in bolt 4e goes through the handle vertical pipe and is screwed into the draw-in nut which is fixed on the front fork vertical pipe, which ensures that the handle vertical pipe presses against a bearing of head pipe with proper pressure. Then the handle vertical pipe is deformed and fixed tightly on the front fork vertical pipe by screwing the fastening bolt for the pipe clamp.

The concave on the upper surface of the lower cover and the step on the top of the handle vertical pipe may be circular. The circular step and the circular concave rotatably engage with each other, so that, the handle can be rotated after the cover locking mechanism is released, which is more simple and convenient to operate.

An arc groove 11, which conforms to the clamped part of the handle 1, is disposed on an upper surface of the circular step 6 of the handle vertical pipe, where the clamped part of the handle 1 contacts the circular step 6. When being clamped by the upper cover and the lower cover with the cover locking mechanism, the handle can be held in the arc groove, which makes the handle be clamped more reliably and stably and prevents the handle from sliding under external forces.

Two arc grooves 11, which conform to the clamped part of the handle 1, may be disposed on the upper surface of the circular step 6 of the handle vertical pipe, where the clamped part of the handle 1 contacts the circular step 6. One arc groove is at a 90° angle to the plane of bicycle frame, which enables the position of the handle adjustable before a user rides the bicycle properly. The other arc groove is parallel to the plane of bicycle frame approximately, which makes the handle occupy the minimum space after being folded. The two arc grooves ensure that the handle is clamped reliably when the handle is in use or folded, and prevent the handle from sliding under the external forces.

To ensure that the handle 1 stays at an adjusted angle and remains unchanged, antiskid strictures are disposed between the upper cover 2 and the handle, and between the circular step 6 and the handle. An upper groove which conforms to a clamped part of the handle is disposed inside the upper cover 2. As shown in FIG. 3, the arc grooves 11, which is disposed on the upper surface of the circular step 6 of the handle vertical pipe, are provided with convex teeth 12. The clamped part of the handle 1 is provided with concave teeth 13 which engage with the convex teeth 12. By shape constraint of the convex and concave teeth, the clamped handle can stay at the adjusted angle reliably without any turning, and will not sway even if it is impacted by considerable external forces. The handle is fixed more stably and reliably. The antiskid strictures between the upper cover 2 and the handle and between the circular step 6 and the handle may alternatively be knurling structures on surfaces of the arc grooves and on surface of the clamped part of the handle. The antiskid strictures between the upper cover 2 and the handle and between the circular step 6 and the handle may alternatively be antiskid rubber pads disposed between the arc grooves and the clamped part of the handle.

Figure 5:
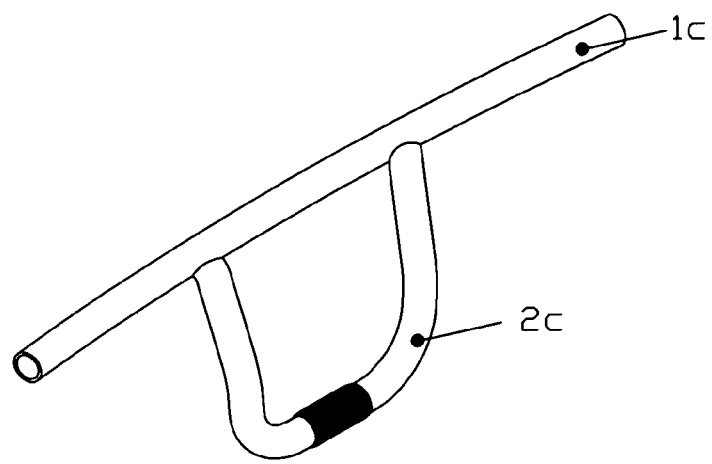
FIG. 5 is a schematic view illustrating a handle of bicycle according to one embodiment of the present invention.

In order to increase intensity and rigidity of the handle, the handle may, as shown in FIG. 5, comprise a rigid body 2c respectively at left and right of a handle. The two rigid bodies respectively extend downwards to left side and right side of the adjusting mechanism and get connected by a horizontal part having a cross section which is roughly circular or polygonal. What's more, the two rigid bodies may be bent either forwards or backwards all together to avoid interferences between the two rigid bodies and components of the bicycle (the bicycle frame especially), which makes the bicycle occupy less space and have better safety performance after being folded.

Figure 6:
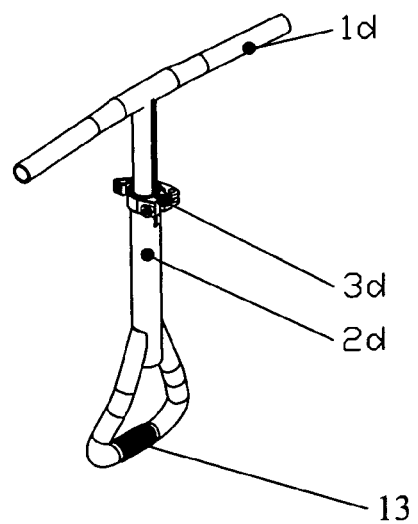
FIG. 6 is a schematic view illustrating a handle of bicycle according to another embodiment of the present invention.
Figure 7:
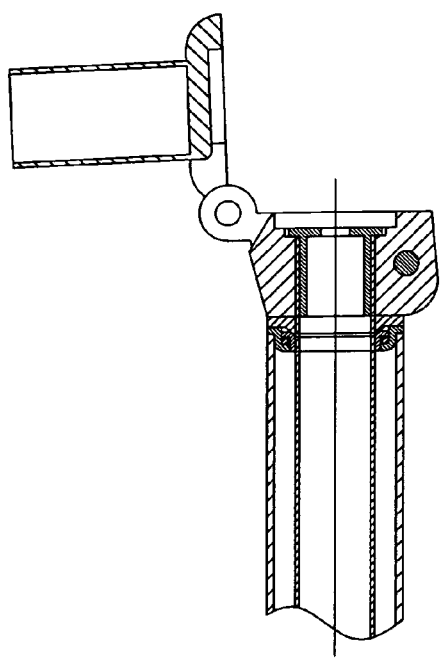
FIG. 7 is a schematic view illustrating a common folding mechanism for handle of bicycle in the prior art.

In order that the handle can also be adjusted in vertical direction, the handle may alternatively, as shown in FIG. 6, comprise a T-shaped handle 1d, a stand pipe 2d and a handle locking mechanism 3d, which may be an eccentric drag-link mechanism commonly known as the quick release. The T-shaped handle is inserted into the stand pipe, the T-shaped handle and the stand pipe are fixed together with the handle locking mechanism. The handle can be adjusted in vertical direction by adjusting depth of insertion of the T-shaped handle in the stand pipe, which makes the bicycle more comfortable.

What is claimed is:

1. An adjusting mechanism for handle position of bicycle, comprising an upper cover and a lower cover for clamping the handle, and a handle vertical pipe; the handle vertical pipe adapts to be fixed on a front fork vertical pipe with a pipe locking mechanism; the upper cover and the lower cover for clamping the handle are connected with each other on one side; wherein the upper cover and the lower cover are locked together with an independent cover locking mechanism on another side; top of the handle vertical pipe is provided with a step; the lower cover is sleeved outside the handle vertical pipe and disposed below the step of the handle vertical pipe; an upper surface of the step of the handle vertical pipe is provided with at least one groove which conforms to a clamped part of the handle; the handle is disposed on the step such that the step is located between the handle and the lower cover.

2. The adjusting mechanism for handle position of bicycle according to claim 1, wherein the cover locking mechanism for the upper cover and the lower cover is a quick release mechanism.

3. The adjusting mechanism for handle position of bicycle according to claim 2, wherein an upper groove which conforms to a clamped part of the handle is disposed inside the upper cover.

4. The adjusting mechanism for handle position of bicycle according to claim 1, wherein an upper surface of the step of the handle vertical pipe is provided with two grooves which conform to a clamped part of the handle; one arc groove is at a 90° angle to a plane of bicycle frame, the other arc groove is parallel to the plane of bicycle frame approximately, which enables the handle to cling to the bicycle frame and occupy minimum space after being folded.

5. The adjusting mechanism for handle position of bicycle according to claim 4, wherein an upper groove which conforms to a clamped part of the handle is disposed inside the upper cover.

6. The adjusting mechanism for handle position of bicycle according to claim 1, wherein an upper groove which conforms to a clamped part of the handle is disposed inside the upper cover.

7. The adjusting mechanism for handle position of bicycle according to claim 1, wherein the step is a circular step; and antiskid strictures are disposed between the upper cover and the handle, and between the circular step and the handle.

8. The adjusting mechanism for handle position of bicycle according to claim 7, wherein the antiskid strictures are convex teeth and concave teeth which engage with one another.

9. The adjusting mechanism for handle position of bicycle according to claim 1, wherein the handle comprises a rigid body respectively at left and right of a handle; the two rigid bodies respectively extend downwards to left side and right side of the adjusting mechanism and get connected by a horizontal part having a cross section, which is roughly circular or polygonal; the two rigid bodies are either bent forwards or backwards all together.

10. The adjusting mechanism for handle position of bicycle according to claim 1, wherein the handle comprises a T-shaped handle, a stand pipe, and a handle locking mechanism; the T-shaped handle is inserted into the strand pipe, and the T-shaped handle and the stand pipe are fixed together with the handle locking mechanism.

* * * * *